United States Patent
Fujii et al.

[11] Patent Number: 5,129,479
[45] Date of Patent: Jul. 14, 1992

[54] SUSPENSION SYSTEM FOR AN ENGINE AND TRANSMISSION ASSEMBLY MOUNTED TRANSVERSELY IN A VEHICLE

[75] Inventors: Yuichi Fujii, Okazaki; Tetsuya Nakayama, Toyota, both of Japan

[73] Assignee: Toyota Jidosha Kabushiki Kaisha, Aichi, Japan

[21] Appl. No.: 625,378

[22] Filed: Dec. 11, 1990

[30] Foreign Application Priority Data

Dec. 12, 1989 [JP] Japan ............................ 1-320455

[51] Int. Cl.⁵ .................................. B60K 5/04
[52] U.S. Cl. ............................ 180/297; 180/300; 248/659; 267/141.2; 267/153
[58] Field of Search ............... 180/297, 300; 267/292, 267/293, 141.2, 153; 248/659

[56] References Cited

U.S. PATENT DOCUMENTS 4,610,421 9/1986 Ohta et al. .................... 180/297 X
4,667,764 5/1987 Sawada et al. ................ 180/300 X

FOREIGN PATENT DOCUMENTS 57-135426 8/1982 Japan .
63-95928 6/1988 Japan .
2222126 2/1990 United Kingdom ............... 180/297

Primary Examiner—Andres Kashnikow
Assistant Examiner—Michael Mar
Attorney, Agent, or Firm—Kenyon & Kenyon

[57] ABSTRACT

A suspension system includes an engine and transmission assembly mounted transversely in a vehicle and having a main axis of moment of inertia extending in a left and right direction of the vehicle, a single first mount located at a first end of the engine and transmission assembly and at least one additional mount located in the vicinity of an opposite second end of the assembly. The center of gravity of the assembly is located on a main axis of moment of inertia of the assembly extending between the first and second ends and is closer to the first end than to the second end. The mount is a bushing-type mount and is oriented so that the central axis of the mount extends parallel to the main axis of moment of inertia of the assembly so that the mount supports the assembly in a front and rear direction of the vehicle to suppress rocking of the assembly during acceleration and deceleration. The mount has a soft spring characteristic in an up and down direction so that high frequency engine vibrations are prevented from being transmitted to the vehicle body.

9 Claims, 2 Drawing Sheets

SUSPENSION SYSTEM FOR AN ENGINE AND TRANSMISSION ASSEMBLY MOUNTED TRANSVERSELY IN A VEHICLE

BACKGROUND OF THE INVENTION

1. Field of the Invention

The present invention relates to a suspension system for an engine and transmission assembly mounted transversely in a vehicle.

2. Description of the Prior Art

In a suspension system for an engine and transmission assembly mounted transversely in a vehicle, it is necessary to prevent rocking of the engine and transmission assembly, especially during acceleration and deceleration, and also to prevent transmittance of engine vibrations to the vehicle body. However, these requirements are incompatible with each other, and both cannot be fully achieved in conventional suspension systems.

More particularly, to prevent engine vibrations from being transmitted to the vehicle body, the engine mounts need to be designed as soft as possible. In contrast, to suppress rocking of the engine and transmission assembly in a front and rear direction of the vehicle, the engine mounts supporting the assembly need to be designed as stiff as possible. Further, to reduce vibration amplitudes, the mounts should also be designed to be stiff so that the vibrational system including the assembly mass and the mount springs has a high natural frequency. Therefore, the above-described requirements have been thought to be incompatible with each other.

SUMMARY OF THE INVENTION

An object of the invention is to provide a suspension system for an engine and transmission assembly mounted transversely in a vehicle wherein prevention of rocking of the engine and transmission assembly and prevention of transmittance of engine vibrations to the vehicle body are satisfied at the same time.

The above-described object is attained by a suspension system according to the invention that includes an engine and transmission assembly mounted transversely in a vehicle and having a main axis of moment of inertia extending in a left and right direction of the vehicle between a first end and a second end of the assembly, with the assembly having a center of gravity located on the main axis of the moment of inertia and closer to the first end than to the second end of the assembly; a first mount located in the vicinity of the first end of the engine and transmission assembly; and at least one other mount located in the vicinity of the second end of the assembly. The first mount is a bushing-type mount having an axis oriented parallel to the main axis of moment of inertia of the engine and transmission assembly.

Preferably, the bushing-type first mount includes a resilient member having solid side portions so that the mount is relatively stiff in a front and rear direction of the vehicle and perforated upper and lower portions so that the mount is relatively soft in an up and down direction.

In the above-described suspension system, since the first mount provides stiff support for the engine and transmission assembly in the front and rear direction of the vehicle at the first end of the assembly, which is nearer to the center of gravity, rocking of the engine and transmission assembly in the front and rear direction of the vehicle is effectively suppressed. Further, since the first mount supports the engine and transmission assembly in a soft manner in the up and down direction, transmittance of engine vibrations to the vehicle body will be prevented.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENT

Figure 1:
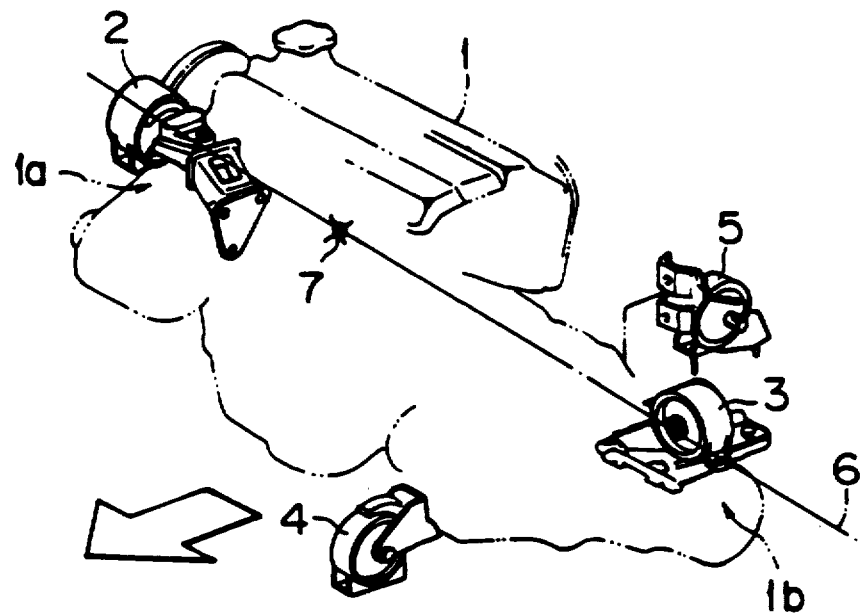
FIG. 1 is an oblique view of a suspension system for an engine and transmission assembly including first through fourth mounts in accordance with one embodiment of the present invention.
Figure 2:
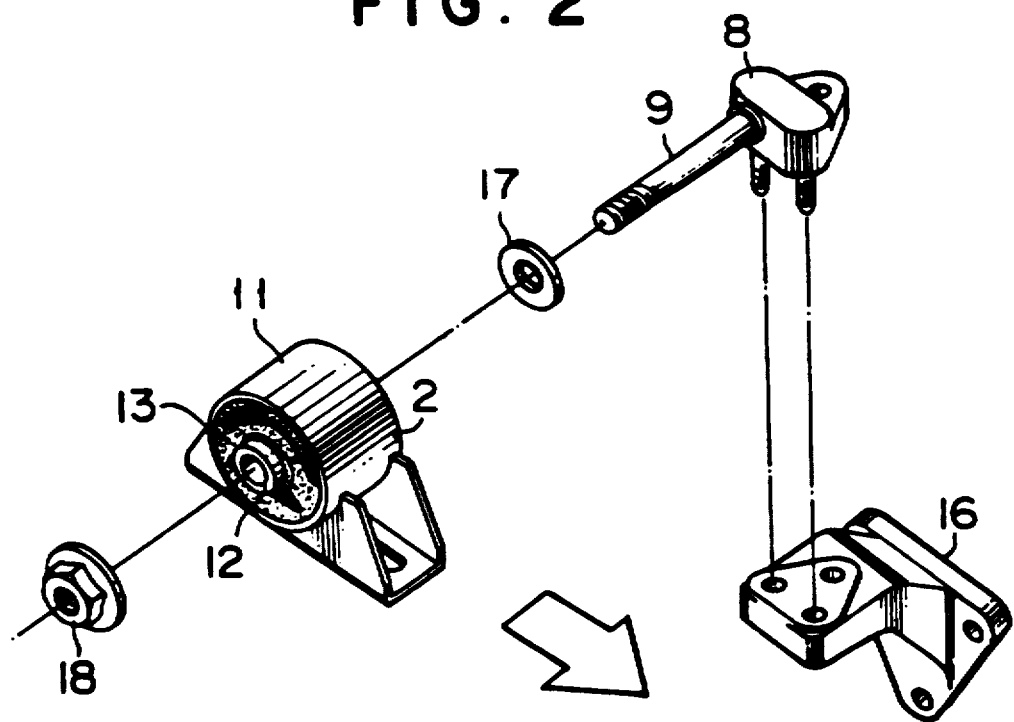
FIG. 2 is an enlarged, disassembled oblique view of the first mount, a pin member coupled to the first mount, and a bracket for supporting the pin member, of the suspension system of FIG. 1.
Figure 3:
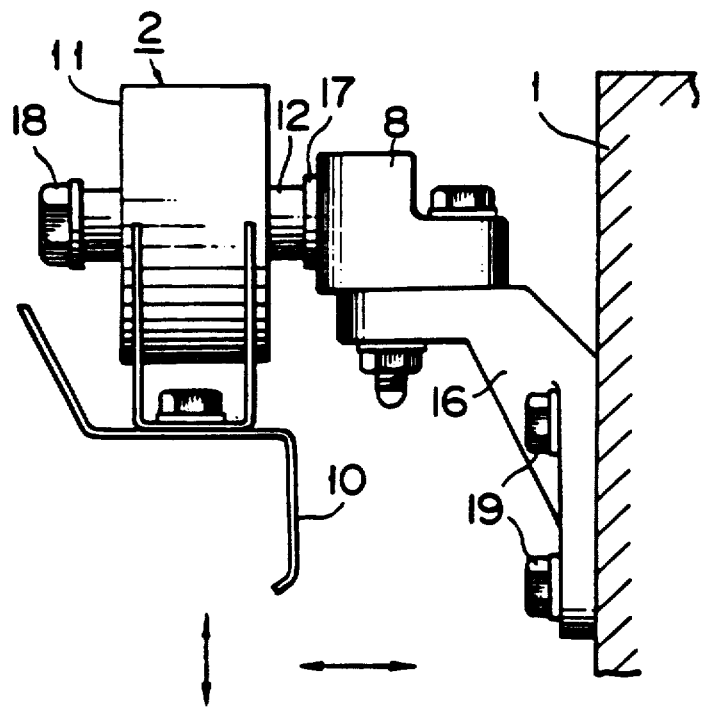
FIG. 3 is an enlarged side elevation view of the assembled first mount, the pin member, and the bracket of FIG. 2.
Figure 4:
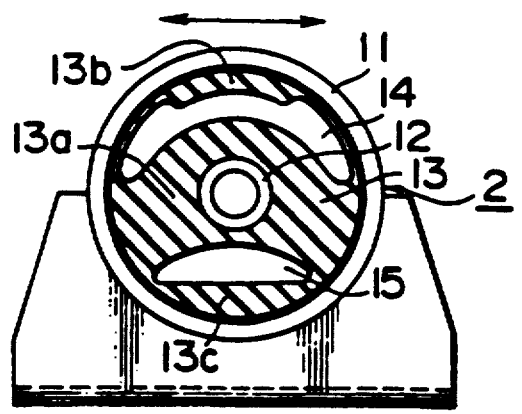
FIG. 4 is an end elevation view in partial cross section of the first mount of FIG. 3.
Figure 5:
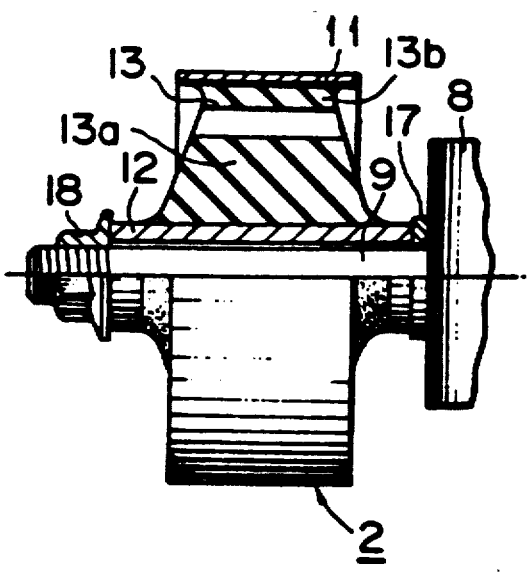
FIG. 5 is a side elevation view in partial cross section of the first mount and the pin member of the first mount of FIG. 3.

As illustrated in FIG. 1, a suspension system for an engine and transmission assembly in accordance with one embodiment of the present invention includes an engine and transmission assembly 1, a first mount 2 and at least one additional mount which in this embodiment includes a second mount 3, a third mount 4, and a fourth mount 5. The engine and transmission assembly 1 is mounted transversely in a vehicle so that a main axis of moment of inertia 6 of the engine and transmission assembly 1 extends in a left and right direction of the vehicle. The first mount 2 is located in the vicinity of a first end 1a of the assembly, with the at least one other mount (in this case, mounts 3, 4, and 5) being mounted in the vicinity of a second end 1b of the assembly. The center of gravity 7 of the assembly 1 is located on the main axis of moment of inertia 6 of the assembly 1 closer to the first end 1a than to the second end 1b. The first mount 2 is a cylindrical bushing-type mount having an axis that extends in parallel with the main axis of moment of inertia 6 of the assembly 1, preferably substantially coincident with the main axis of moment of inertia 6 of the engine and transmission assembly 1. Due to this arrangement, the first mount 2 can support the engine and transmission assembly 1 without permitting rocking of the assembly 1 in the front and rear direction of the vehicle or rotation of the assembly 1 about the mount axis.

As illustrated in FIGS. 2 through 5, the suspension system further includes a pin member 8 with a pin 9 which is inserted into the first mount 2. The first mount 2 is fastened to a vehicle body 10 or a vehicle body frame member, and the pin member 8 is secured to the engine and transmission assembly 1. The first mount 2 includes a cylindrical metal outer member 11, a cylindrical metal inner member 12, and a resilient rubber member 13 connecting the outer member 11 and the inner member 12. The pin 9 of the pin member 8 is inserted through the inner member 12. The resilient member 13 includes solid rubber side portions 13a, so that the first mount 23 has a relatively high spring constant in the front and rear direction of the vehicle. This solid rubber structure therefore reduces rocking and vibration amplitude of the engine and transmission assembly 1 in the front and rear direction of the vehicle.

Since the pin member 8 and the inner member 12 is less than the weight of the outer member 11, securing the pin member 8 to the engine and transmission assembly 1 will make the weight of the supported structure lighter than if the outer member 11 of the bushing-type mount were secured to the engine and transmission assembly. This lighter weight raises the natural frequency of the vibrational system including a mass defined by the engine and transmission assembly 1 and the pin member 8 and a spring defined by the resilient member 1 of the mount 2. As a result, the vibration amplitude of the vibrational system in the front and rear direction of the vehicle will be further suppressed. In addition, the cylindrical structure of the first mount 2 minimizes the size of the first mount 2 compared to mounts having other configurations. Further, since the outer member 11 of the first mount 1 also functions as a stopper for restricting an excessive movement of the first end of the engine and transmission assembly 1, a separate absorber or other member for restricting the movement of the assembly 1 will not be needed, thereby reducing cost and weight of the suspension system.

The elastic member 13 of the first mount 13 also includes an upper portion 13b and a lower portion 13c which have openings 14 and 15, respectively, formed in the rubber material. The openings 14 and 15 extend in a substantially horizontal direction so as to lower the stiffness of the first mount 2 in an up and down direction. This structure lowers the spring constant of the vibrational system in the up and down direction so that engine vibrations are prevented from being transmitted to the vehicle body and to a passenger compartment through the vehicle body.

The suspension system further includes an L-shaped bracket 16, a spacer 17, and a nut 18. The bracket 16 is fixed to the engine and transmission assembly 1 by bolts 19. The pin member 8 is fixed to the bracket 16 and thereby to the engine and transmission assembly. The spacer 17 which is in the form of an annular plate or washer is fitted to the pin member 8 so that the pin 9 extends through the bore of the washer 17. After the spacer 17 is mounted on the pin, the first mount 2 is assembled onto the pin member 8 by inserting the pin 9 through the inner member 12 of the first mount 2. After the first member 2 is mounted on the pin member 8, the nut 18 is screwed onto a threaded tip portion of the pin 9 so that the inner member 12 is compressed between the nut 18 and the spaces 17. Due to this structure, a load can be borne not only by the pin 9 but also by the inner member 12, so that the load acting on the pin 9 is decreased. As a result, the diameter of the pin 9 can be minimized and the weight of the pin member 8 also can be minimized to further reduce the vibration amplitude of the vibrational system.

As previously mentioned, the at least one additional mount of the suspension system further includes a second mount 3. The second mount 3 is located at the second end 1b of the engine and transmission assembly 1 positioned farther from the gravity center 7 of the engine and transmission assembly 1 in the direction along the main axis of moment of inertia 6 of the assembly 1. The second mount 3 is a bushing-type mount having an axis that extends in a direction perpendicular to the main axis of moment of inertia 6 of the engine and transmission assembly 1 so that the engine and transmission assembly 1 is supported in the transverse direction of the vehicle by the second mount 3.

The at least one additional mount of the suspension system of this embodiment further includes a third mount 4 located at a front portion of the engine and transmission assembly 1 and a fourth mount 5 located at a rear portion of the engine and transmission assembly near the second end 1b of the assembly. Each of the third mount 4 and the fourth mount 5 is a bushing-type mount having an axis that is parallel to the main axis of moment of inertia 6 of the engine and transmission assembly 1, so that the assembly 1 is supported by the third and fourth mounts 4 and 5 in the vicinity of the second end 1b of the assembly 1 in the front and rear direction of the vehicle.

The functions of the suspension system of the invention will now be explained.

At acceleration and deceleration periods of the vehicle operation, the engine and transmission assembly exerts inertial forces in the front and rear directions of the vehicle. The inertial forces in the front and rear directions of the vehicle are resisted by the first mount 2 at the first end 1a of the assembly 1 and by the third and fourth mounts 4 and 5 at the second end 1b of the assembly. Since the first mount 2 is located nearer to the center of gravity 7 of the assembly 1 than the other mounts 3, 4, and 5, a greater portion of the inertial forces in the front and rear directions of the vehicle 1 are borne by the first mount 2. These inertial forces will tend to cause a horizontal oscillatory movement of the center of gravity 7 relative to the vehicle body and consequently rotation (rocking) of the center of gravity 7 around the axis of the first mount 2, if the mount axis is offset from the main axis of moment of inertia 6. In this embodiment, since the mount axis of the first mount 2 is oriented in the left and right direction of the vehicle and the side portions 13a of the resilient member 13 are solid rubber, the first mount 2 well supports the assembly 1 in the front and rear directions to suppress the horizontal movement of the assembly 1 in the front and rear directions of the vehicle. Further, since the mount rubber 13 is designed to have a relatively high bulk modulus, horizontal vibration of the assembly in the front and rear directions is suppressed. Finally, if the mount axis of the first mount 1 coincides with the main axis of the moment of inertia 6 of the assembly 1, the assembly 1 is unlikely to rotate around the mount axis. As a result, rocking is unlikely to occur.

While the engine is operating, engine vibrations having relatively high frequencies tend to be transmitted to the vehicle body 10 which will cause a noise in the passenger compartment. In the present invention, since the first mount 2 has a soft spring constant in the up and down direction due to the openings 14 and 15 formed in the rubber member 13, the first mount 2 can effectively cut the transmittance of the engine vibrations with high frequencies, whereby noise in the passenger compartment will be greatly reduced.

In accordance with the present invention, both prevention of rocking and vibration of the engine and transmission assembly in the front and rear direction of the vehicle and prevention of transmittance of engine vibrations to the vehicle body are performed by the single first mount 2 at the same time.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A suspension system for an engine and transmission assembly having a first end, a second end, and a main axis of inertia extending between the first end and the second end, the engine and transmission assembly being mounted transversely in a vehicle and having a center of gravity located on the main axis of inertia, the suspension system including:
    a first bushing-type mount installed in the vehicle in the vicinity of the first end of the engine and transmission assembly and having a central axis oriented transversely in the vehicle, the first mount being stiffer in a longitudinal direction of the vehicle than in a vertical direction;
    means for connecting the first mount to the engine and transmission assembly;
    a second mount installed in the vehicle in the vicinity of the second end of the engine and transmission assembly; and
    means for connecting the second mount to the engine and transmission assembly, wherein the improvement comprises:
    at least one other mount installed in the vehicle closer to the second end than to the first end of the assembly; and
    the first mount being located closer to the center of gravity of the engine and transmission assembly than the second mount.

2. The suspension system according to claim 1, wherein the central axis of the first mount substantially coincides with the main axis of moment of inertia of the engine and transmission assembly.

3. The suspension system according to claim 1, wherein the means for connecting the first mount to the engine and transmission assembly comprises a pin member having a pin inserted into the bushing-type first mount, means for securing the first mount to the vehicle body and wherein the means for connecting the first mount to the engine and transmission assembly comprises means for coupling the pin member to the engine and transmission assembly.

4. The suspension system according to claim 3, wherein the means for coupling the pin member to the engine and transmission assembly comprises a bracket fixed to the first end of the engine and transmission assembly, the pin member being fixed to the bracket, a spacer fitted onto the pin of the pin member on one side of the bushing-type first mount, and an ut screwed onto a tip portion of the pin on the other side of the bushing-type first mount so that the first mount is axially clamped between the nut and the spacer.

5. The suspension system according to claim 1, wherein the bushing-type first mount comprises a cylindrical metal outer member, a cylindrical metal inner member, and a resilient rubber member connecting the outer member and the inner member.

6. The suspension system according to claim 5, wherein the resilient rubber member of the first mount includes side portions constructed of solid rubber so that the mount has a high spring constant in a front and rear direction of the vehicle.

7. The suspension system according to claim 5, wherein the resilient rubber member of the first mount includes an upper portion and a lower portion each having an opening formed therein so that the mount has a relatively low spring constant in an up and down direction.

8. A suspension system for an engine and transmission assembly mounted transversely in a vehicle, the engine and transmission assembly having a first end, a second end, a main axis of inertia extending between the first end and the second end, and a center of gravity located on the main axis of inertia, the suspension system including:
    a first bushing-type mount installed in the vehicle in the vicinity of the first end of the engine and transmission assembly and having a central axis oriented transversely in the vehicle, the first mount being stiffer in a longitudinal direction of the vehicle than in a vertical direction;
    means for connecting the first mount to the engine and transmission assembly;
    at least one other mount installed in the vehicle in the vicinity of the second end of the engine and transmission assembly; and
    means for connecting the at least one other mount to the engine and transmission assembly, wherein the improvement comprises:
    the at least one other mount including a second mount located at the second end of the engine and transmission assembly, the second mount being a bushing-type mount having an axis oriented in a direction perpendicular to the main axis of moment of inertia of the engine and transmission assembly, and
    the first mount being located closer to the center of gravity of the engine and transmission assembly than the second mount.

9. The suspension device according to claim 8, wherein the at least one other mount further comprises a third mount located at a front portion of the engine and transmission assembly closer to the second end than to the first end and a fourth mount located at a rear portion of the engine and transmission assembly closer to the second end than to the first end, the third mount and the fourth mount each comprising a bushing-type mount having an axis oriented parallel to the main axis of moment of inertia of the engine and transmission assembly.

* * * * *

UNITED STATES PATENT AND TRADEMARK OFFICE
CERTIFICATE OF CORRECTION

PATENT NO. : 5,129,479
DATED     : July 14, 1992
INVENTOR(S) : Yuichi FUJII, et al.

It is certified that error appears in the above-identified patent and that said Letters Patent is hereby corrected as shown below:

Column 2, line 60, delete the comma after "system".

Column 3, line 8, change "is" to --are--.

Column 3, line 18, change "1" to --13--.

Column 5, line 60, change "an ut" to --a nut--.

Signed and Sealed this

Twenty-eighth Day of September, 1993

Attest:

BRUCE LEHMAN

Attesting Officer    Commissioner of Patents and Trademarks